US012647785B2

(12) United States Patent
Liu et al.

(10) Patent No.: US 12,647,785 B2
(45) Date of Patent: Jun. 2, 2026

(54) SYSTEMS AND METHODS FOR AUTHORIZING IAB NODE CONNECTIONS BASED ON IAB NODE IDENTITY INFORMATION

(71) Applicant: ZTE CORPORATION, Shenzhen (CN)

(72) Inventors: Yuze Liu, Shenzhen (CN); Shilin You, Shenzhen (CN); Jin Peng, Shenzhen (CN); Wantao Yu, Shenzhen (CN); Zhaoji Lin, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 504 days.

(21) Appl. No.: 17/889,758

(22) Filed: Aug. 17, 2022

(65) Prior Publication Data

US 2022/0394472 A1     Dec. 8, 2022

Related U.S. Application Data

(63) Continuation of application No. PCT/CN2020/076714, filed on Feb. 26, 2020.

(51) Int. Cl.
*H04W 12/08*     (2021.01)
*H04W 8/18*     (2009.01)
*H04W 12/72*     (2021.01)

(52) U.S. Cl.
CPC ............. *H04W 12/08* (2013.01); *H04W 8/18* (2013.01); *H04W 12/72* (2021.01)

(58) Field of Classification Search
CPC ......... H04W 4/40; H04W 4/46; H04W 12/37;
H04W 12/106; H04W 12/10; H04W 12/0471; H04W 12/041; H04W 12/037; H04W 12/033; H04W 12/03; H04W 12/08; H04W 12/72; H04W 48/02; H04W 8/18; H04L 63/045; H04L 63/0428
See application file for complete search history.

(56) References Cited

U.S. PATENT DOCUMENTS

2011/0314522 A1     12/2011 Palanigounder et al.
2016/0021635 A1* 1/2016 Lee ........................ H04W 12/08
455/411

(Continued)

FOREIGN PATENT DOCUMENTS

CN     102893646 A     1/2013
CN     106537943 A     3/2017

(Continued)

OTHER PUBLICATIONS

ETSI TS 123 502 V15.8.0 (Jan. 2020) 5G; Procedures for the 5G System (5GS) (3GPP TS 23.502 version 15.8.0 Release 15) (Year: 2020).*

(Continued)

*Primary Examiner* — Jeanette J Parker
*Assistant Examiner* — Dung L Lam
(74) *Attorney, Agent, or Firm* — Foley & Lardner LLP

(57) ABSTRACT

Systems and methods for wireless communications are disclosed herein. In one embodiment, a wireless communication method includes storing, by a first network entity, mapping information and determining, by the first network entity, based on identification information and the mapping information, that a first node is authorized to connect to a network.

18 Claims, 8 Drawing Sheets

(56) References Cited

U.S. PATENT DOCUMENTS

| | | | |
|---|---|---|---|
| 2016/0295398 A1 | 10/2016 | Ketheesan et al. | |
| 2018/0115893 A1* | 4/2018 | Lee | H04W 12/08 |
| 2019/0159277 A1* | 5/2019 | Zhu | H04L 45/16 |
| 2021/0105622 A1* | 4/2021 | Rajadurai | H04W 8/08 |
| 2022/0174497 A1* | 6/2022 | Guo | H04W 12/126 |
| 2022/0201638 A1* | 6/2022 | Arrobo Vidal | H04W 48/08 |
| 2022/0312163 A1* | 9/2022 | Xu | H04W 24/10 |
| 2022/0394472 A1* | 12/2022 | Liu | H04W 48/02 |
| 2023/0300674 A1* | 9/2023 | Kedalagudde | H04W 24/10 370/230.1 |

FOREIGN PATENT DOCUMENTS

| | | | | |
|---|---|---|---|---|
| CN | 108347748 A | 7/2018 | | |
| CN | 109155949 A | 1/2019 | | |
| CN | 109964509 A | 7/2019 | | |
| CN | 110536375 A | 12/2019 | | |
| EP | 4013091 A1 | 6/2022 | | |
| FI | 126129 B | * 7/2016 | | G10L 17/00 |

OTHER PUBLICATIONS

Ericsson: "Alignment with stage 3 on Immediate Report for Nudm_SDM_Subscribe" 3GPP TSG-SA2 Meeting #136AH; S2-2000281; Jan. 17, 2020(Jan. 17, 2020); Incheon, KR (18 page).

Ericsson: "IAB node Registration procedure" 3GPP SA WG2 Meeting #S2-135 S2-1909350 Oct. 18, 2019(Oct. 18, 2019); Split Croatia (24 pages).

Ericsson: "Summary of offline discussion on IAB node indication" 3GPP TSG RAN WG3 Meeting #103bis; R3-192057 Apr. 12, 2019(Apr. 12, 2019; Xi'an, P.R. China (2 pages).

International Search Report and Written Opinion for PCT Appl. No. PCT/CN2020/076714 mailed Dec. 1, 2020(7 pages).

3rd Generation Partnership Project, "Technical Specification Group Services and System Aspects; Study on Security for NR Integrated Access and Backhaul; (Release 16)", 3GPP TR 33.824, Nov. 2019, Sophia Antipolis Valbonne, France (22 pages).

3rd Generation Partnership Project, "Technical Specification Group Services and System Aspects; System architecture for the 5G System (5GS); Stage 2 (Release 16)", 3GPP TS 23.501, V16.3.0, Dec. 2019, Sophia Antipolis Valbonne, France (417 pages).

Extended European Search Report for EP Appl. No. 20889734.8, dated Mar. 2, 2023 (13 pages).

Huawei et al., "Discussion on binding between USIM/UICC and IAB-node", 3GPP TSG SA WG3 (Security) Meeting #96-Adhoc, S3-193462, Oct. 18, 2019, Chongqing (China), 3 pages.

Second Office Action for CN Appl. No. 202080097366.9, dated Oct. 25, 2024 (with English translation, 11 pages).

First Office Action for CN Appl. No. 202080097366.9, dated Jun. 29, 2024 (with English translation, 12 pages).

Third Office Action for CN Appl. No. 202080097366.9, dated Feb. 5, 2025 (with English translation, 14 pages).

Communication pursuant to Article 94(3) EPC for EP Appl. No. 20889734.8, dated Jun. 20, 2025 (7 pages).

* cited by examiner store, by a first network entity, mapping information determining, by the first network entity, based on identification information and mapping information, that a first node is authorized to connect to a network

SYSTEMS AND METHODS FOR AUTHORIZING IAB NODE CONNECTIONS BASED ON IAB NODE IDENTITY INFORMATION

CROSS-REFERENCE TO RELATED APPLICATION

This application claims the benefit of priority under 35 U.S.C. § 120 as a continuation of PCT Patent Application No. PCT/CN2020/076714, filed on Feb. 26, 2020, the disclosure of which is incorporated herein by reference in its entirety.

TECHNICAL FIELD

The disclosure relates generally to wireless communications and, more particularly, to systems and methods of authorizing Integrated Access Backhaul (IAB) node connections based on IAB node identity information.

BACKGROUND

The new-generation mobile communication system New Radio (NR) allows more flexible network deployment than 2G, 3G, and 4G systems. Currently, Integrated Access Backhaul (IAB) nodes integrate the backhaul link and the normal access link providing flexible coverage and network deployment without needing to lay a large number of optical fibers, saving network deployment costs.

The Universal Integrated Circuit Card (UICC) is a physical card that contains a processor, non-volatile memory, random access memory, and read-only memory. The UICC supports several applications such that the card is identifiable on several different networks (e.g., Universal Subscriber Identity Module (USIM) applications for Global System for Mobile (GSM) networks and Code Division Multiple Access (CDMA) Subscriber Identity Module (CSIM) applications for CDMA networks).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some embodiments, a wireless communication method includes storing, by a first network entity, mapping information and determining, by the first network entity, based on received identification information from a first node and mapping information, that the first node is authorized to connect to a network.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Figure 1:
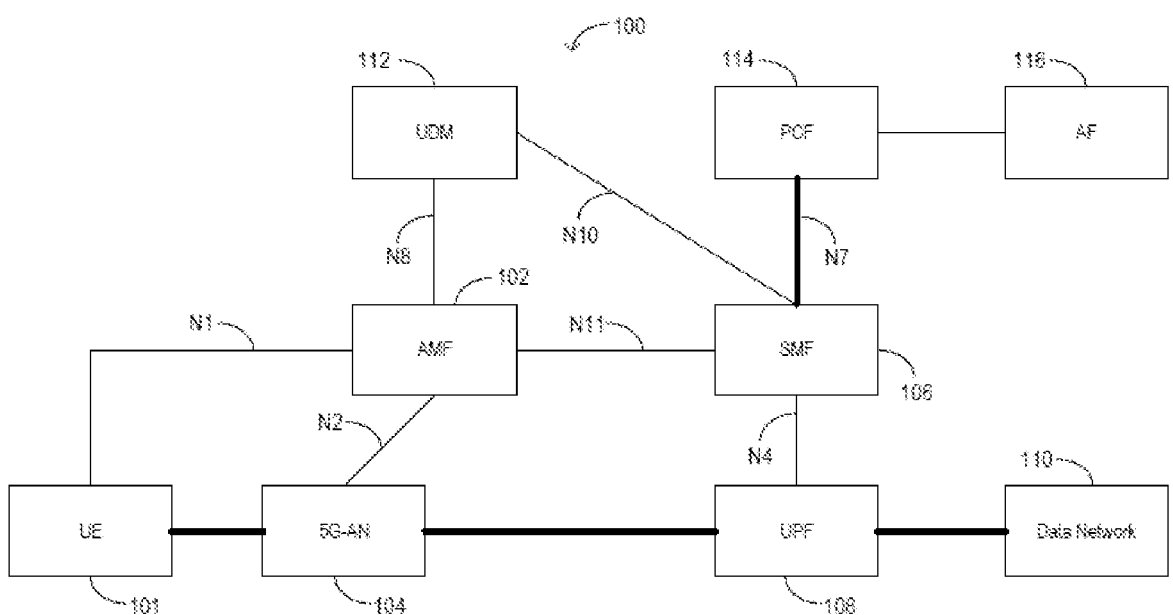
FIG. 1 is a block diagram illustrating an example network system architecture, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

For a new generation mobile communication system, a node that has a wired backhaul link with the core network is a donor IAB (IAB-donor). The IAB-donor includes a centralized unit (CU) and one or more distributed units (DUs) that can obtain downlink data or send uplink data to the core network. A node that is connected wirelessly to the donor IAB (or the upper-layer IAB node) is an IAB node. There is no direct connection between the IAB node and the core network. An IAB node in a radio access network (RAN) can enable simpler deployment and incremental rollout by reducing reliance on the availability of wired backhaul at each access node location. The IAB node interacts with the core network via the IAB-donor forwarding the IAB node message one or more times. That is, the IAB node can send and receive messages from the IAB-donor, and the IAB-donor can send and receive messages from the core network. Alternatively, the IAB node can send and receive messages from a second IAB node, the second IAB node sending and receiving messages from a third IAB node and so on, where one of the IAB nodes communicates with the IAB-donor. Both the donor IAB and the IAB node support terminal access.

The IAB node has two functions. The first function is a DU function and CU function. An IAB node operating in its DU function behaves as a base station and can be considered an IAB-donor. That is, during IAB-DU functionality, the IAB node can provide wireless access function to the core network for the child node or terminal. The IAB node can provide wireless access to the core network by providing NR Uu access to UEs, where Uu is an interface between a UE and 5G-RAN. Before Uu access is provided to UEs, the IAB node can require credentials to authenticate the UE. The corresponding CU function can control the IAB node operating as a DU via the F1 interface, where authentication of the IAB node using the F1 interface can also be required.

The second function is a mobile terminal (MT, Mobile-Termination) function. An IAB node operating in its MT function behaves as a terminal or a UE, where a UE may be a wireless communication device (e.g., a cellphone). That is, during IAB-MT functionality, the IAB node behaves as an IAB-UE and is controlled and scheduled by the IAB-donor.

The IAB node can be considered as including both a software component and a hardware component. Generally, the hardware component of the IAB node can be considered the mobile equipment (ME). The ME of the IAB node is configured such that the IAB node can function as a DU or a UE. In one instance, the software component can utilize a removable UICC. The removable UICC of the IAB node can store USIM credentials necessary for authentication/authorization of a device on a cellular network.

In some embodiments, the IAB integration into the network can include three phases: 1) IAB-UE setup; 2) Backhaul RLC channel establishment and routing update; and 3) IAB-DU setup. During IAB-UE setup, the IAB node performs registration of the network as a UE. That is, the IAB node establishes a secure connection between the IAB-donor and IAB-UE. An IAB node configured as a UE is authenticated using the same or similar authentication process as a traditional UE. In one embodiment, to support Authentication Key Agreements (AKA) Authentication methods, the USIM in the IAB node can reside on the removable UICC.

While authentication credentials in the IAB node can be protected, in the situation in which the credential(s) of the IAB node are transferred from the IAB node to an attacker device without authorization, the attacker device could "impersonate" the IAB node. The threat of an attacker impersonating an IAB node increases when the IAB node is deployed in an open environment. IAB nodes can be deployed in specific places and accessed by specific IAB donors, therefore, impersonated IAB nodes, IAB nodes used in unexpected places or by unexpected IAB donors, may disrupt service in the core network.

FIG. 1 is a block diagram illustrating an example network system architecture 100, in accordance with an embodiment of the present disclosure. Referring to FIG. 1, the example of the network system architecture 100 is a 5GS architecture. The network system architecture 100 includes various network entities such as but not limited to, an AMF 102, a session management function (SMF) 106, a user plane function (UPF) 108, a UDM 112, a PCF 114, an application function (AF) 116, and so on.

The AMF 102 includes functionalities such as but not limited to, UE mobility management, reachability management, connection management, and so on. For example, the AMF 102 is where a communication protocol (CP) interface N2 of a RAN and a non-access stratum (NAS) CP interface N1 determinate. The CP interface N2 is used for a communication link between the RAN (e.g., a 5G-access network (AN) 104) and the AMF 102. The NAS CP interface N1 is used for a communication link between a UE 101 (e.g., a wireless communication device) and the AMF 102. AMF 102 also performs NAS ciphering and integrity protection. The UE 101 is connected to the 5G-AN 104.

Furthermore, the AMF 102 distributes session management (SM) NAS to appropriate SMFs (e.g., the SMF 106) via CP interface N11. The SMF 106 includes functions such as but not limited to, UE internet protocol (IP) address allocation and management, selection and control of user plane (UP) functions, PDU connection management, and so on.

In some implementations, the UPF 108 is an anchor point for intra-radio access technology (RAT) mobility or inter-RAT mobility. The UPF 108 can also be an external PDU session point of interconnect to a data network 110 connected to the UPF 108. In that regard, the UPF 108 is connected to the SMF 106 via CP interface N4. The UPF 108 can route and forward data packets as an indication from the SMF 106. The UPF 108 can buffer downlink (DL) data while the UE 101 is in an idle mode. The UPF 108 is connected to the 5G-AN 104.

The UDM 112 can store subscription profiles for the UEs, including but not limited to, the UE 101. The UDM 112 is connected to the AMF 102 via CP interface N8. The UDM 112 is connected to the SMF 106 via CP interface N10. The UDM and Authentication credential Repository and Processing Function (ARPF) both belong to the core network and are implemented together. The UDM may hold (e.g., store in a local memory) mapping information, the mapping information including but not limited to, the UICC credentials of pre-authorized IAB-UEs, the pre-authorized identity of the mobile equipment (IAB-ME), and pre-authorized location information and cell identity information for cells.

The PCF 114 can generate police (e.g., policing and enforcement elements) to govern network behaviors based on subscription and indication from the AF 116. The PCF 114 is connected to the AF 116 via a suitable communication link. The PCF 114 can further provide policy rules to CP functions (e.g., the AMF 102 and the SMF 106), which are configured to enforce those policy rules. For example, the PCF 114 can provide the policy rules to the SMF 106 via CP interface N7.

Each of the communication links, CP interfaces, connections, and so on shown as lines between two of the elements 101-116 can be any suitable wired or wireless connection.

Traditionally, in 5GS, the AMF is responsible for authenticating the UICC credentials and authenticating the IAB-ME of the IAB node. The AMF can communicate with the UDM. The communication with the UDM indicating whether the IAB-UE attempting to register is properly authenticated.

The present disclosure is concerned with storing mapping information, such mapping information used in authentication. The mapping information can include the UICC credentials of pre-authorized IAB-UEs, the pre-authorized IAB-ME identities, and pre-authorized location information and cell information of cell. The mapping information can be stored in network entities such as, but not limited to the UDM, AMF, EIR, HSS, MME, or another suitable network entity or function. Furthermore, the network entities such as, but not limited to the UDM, AMF, EIR, HSS or MME can authorize an IAB-UE node attempting to register. The authorization of the IAB-UE node can be determined by performing a check using the stored mapping information and identification information related to the IAB-UE node attempting to register with the network.

Figure 2:
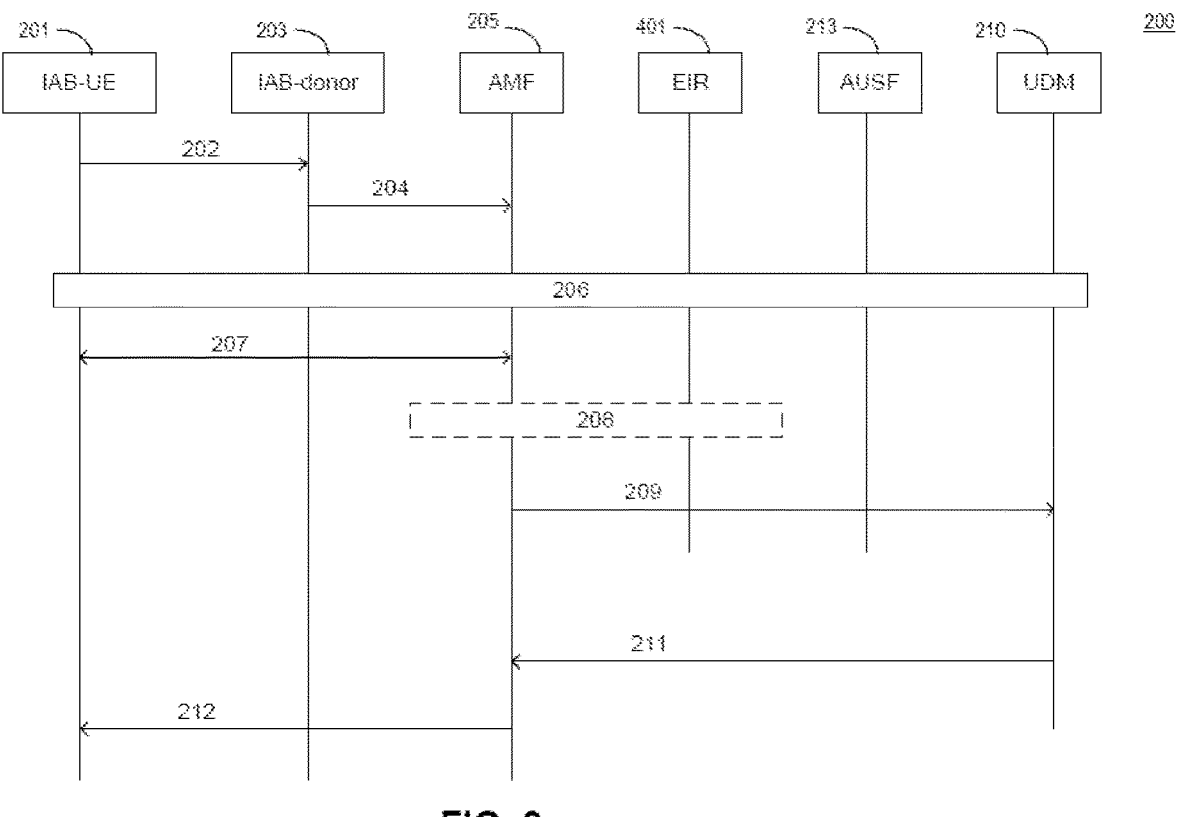
FIG. 2 is a signal diagram illustrating an example procedure for authenticating an IAB-UE via a Unified Data Management (UDM), according to some embodiments of the present disclosure.

FIG. 2 is a signal diagram illustrating an example procedure 200 for authenticating an IAB-UE 201 via a UDM 210, according to some embodiments of the present disclosure. Referring to FIG. 2, the IAB-UE 201 is performing a registration process (e.g., the procedure 200) with respect to an IAB network, including connecting with an IAB-donor 203, an AMF 205, an Equipment Identity Register (EIR) 401, an Authentication Server Function (AUSF) 213, and a UDM 210. The EIR is a register used for authenticating mobile devices in a network. The AUSF manages subscriber authentication during registration or re-registration by obtaining authentication information from the UDM. The procedure 200 includes the UDM 210 authorizing whether the IAB-UE 201 can connect to the IAB network.

At 202, the IAB-UE 201 can send a Registration Request to the IAB-donor 203. The Registration Request can contain credentials in UICC such as but not limited to, Subscription Concealed Identifier (SUCI), 5G Globally Unique Temporary Identity (5G-GUTI), and so on. At 204, the IAB-donor 203 can send an N2 message to an AMF 205. The N2 message can include credentials in UICC and both location information and cell identity information related to the cell in which the IAB-UE 201 is camping. At 206, the AMF 205 can authenticate the credentials that have been received from the IAB-donor 203, for example, in a manner similar to step 9 in TS 23.502 clause 4.2.2.2.2. In some embodiments, at 207, in response to the AMF 205 determining that the AMF 205 does not hold (e.g., does not store in a local memory of the AMF 205) the PEI of the IAB-UE 201, the AMF 205 can send an identity request message to the IAB-UE 201 in a manner similar to step 11 in TS 23.502 clause 4.2.2.2.2. The IAB-UE 201 can respond to the AMF 205 identity request message with an identity response, which includes the PEI of the IAB-UE 201. In other embodiments, the AMF 205 holds (e.g., stores in a local memory of the AMF 205) the PEI of the IAB-UE 201.

In some embodiments, at 208, the AMF 205 can begin an IAB-ME identity check using the identity response message from the IAB-UE 201, for example, in a manner similar to step 12 in TS 23.502 clause 4.2.2.2.2.

At 209, the AMF 205 can send Nudm_SDM_Request to UDM 210, where the Nudm_SDM_Request can contain information related to the credentials in UICC, the IAB-ME identity, and both location information and cell identity information related to the cell in which the IAB-UE 201 is camping. Based on operator policy, the UDM 210 can check one or more of the IAB-UE 201 identification information received at 209 from the AMF 205, against the mapping information stored in the UDM 210. In some embodiments, the UDM 210 can check the received credentials in the UICC and the IAB-ME identity (e.g., received from the AMF 205 at 209) against the stored mapping of the credentials in UICC and the IAB-ME identities. In some embodiments, the UDM 210 can check the received credentials in the UICC, the IAB-ME identity, and the location information related to the cell in which the IAB-UE 201 is camping (e.g., received from the AMF 205 at 209) against the stored mapping information of the credentials in UICC, the IAB-ME identities, and the location information related to the cells in which the IAB-UE 201 can camping. In some embodiments, the UDM 210 can check the received credentials in the UICC, the IAB-ME identity, and both the location information and cell identity information related to the cell in which the IAB-UE 201 is camping (e.g., received from the AMF 205 at 209) against the stored mapping information of the credentials in UICC, the IAB-ME identities, and both the location information and cell identity information related to the cells in which the IAB-UE 201 is camping.

In one embodiment, when the UDM 210 checks the mapping information against the IAB-UE 201 identification information (e.g., the information received from the AMF 205 at 209), the UDM 210 determines whether the stored information matches the IAB-UE 201 identification information received from the AMF 205 at 209.

In one embodiment, the UDM 210 can match the stored credentials in UICC and IAB-ME identity information to the IAB-UE 201 identification information received from the AMF 205 at 209 such as the credentials in UICC and IAB-ME identity information. In one embodiment the UDM 210 can match the stored credentials in UICC, IAB-ME identity information, and location information to the IAB-UE 201 identification information received from the AMF 205 at 209 such as the credentials in UICC, IAB-ME identity information, and location information related to the cell in which the IAB-UE 201 is camping. In one embodiment the UDM 210 can match the stored credentials in UICC, IAB-ME identity information, and both location information and cell identity information related to the cell in which the IAB-UE 201 is camping, to the IAB-UE 201 identification information received from the AMF 205 at 209 such as the credentials in UICC, IAB-ME identity information, and both location information and cell identity information related to the cell in which the IAB-UE 201 is camping.

In response to the IAB-UE 201 identification information matching the stored mapping information, the UDM 210 can determine that the mapping was successful and that IAB-UE 201 is authorized to connect to the network. In response to the IAB-UE 201 identification information not matching the stored mapping information, the UDM 210 can determine that the mapping was not successful and that the IAB-UE 201 is not authorized to connect to the network.

Figure 3:
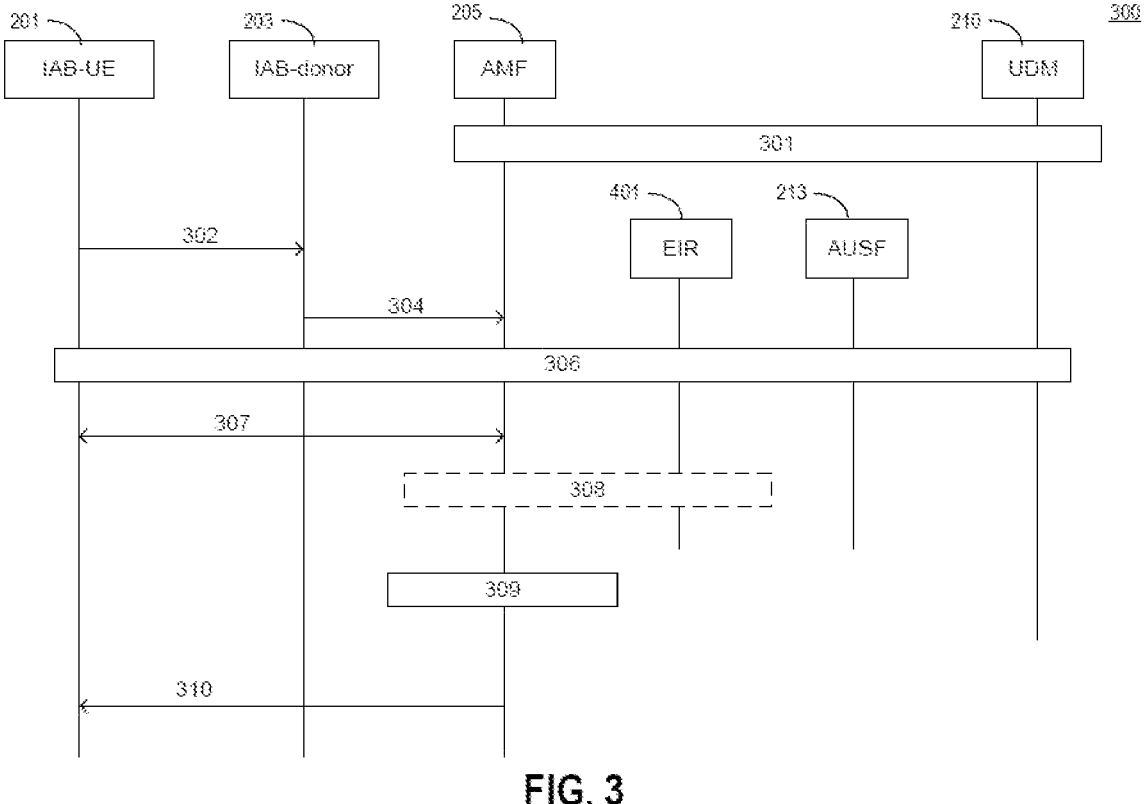
FIG. 3 is a signal diagram illustrating an example procedure for authenticating an IAB-UE via an Access and Mobility Management function (AMF), according to some embodiments of the present disclosure.

At 211, the UDM 210 can send a Nudm_SDM_Response to the AMF 205 indicating the success or failure of the mapping of the IAB-UE information. In some embodiments, in response to the UDM 210 determining that the mapping was successful, at 212, the AMF 205 can send a Registration Accept to the IAB-donor 203, the IAB-donor 203 relaying the UDM 210 response to the IAB-UE 201. Upon receiving the Registration Accept, the IAB-UE 201 is authorized to connect to the network. In other embodiments, in response to the UDM 210 determining that the mapping was not successful, the AMF 205 can send a rejection response to the IAB-donor 203, the IAB-donor 203 relaying the UDM 210 response to the IAB-UE 201. Upon receiving a rejection response to the Registration Request at 202, the IAB-UE 201 is not authorized to connect to the network, FIG. 3 is a signal diagram illustrating an example procedure 300 for authenticating an IAB-UE 201 via an AMF 205, according to some embodiments of the present disclosure. Referring to FIG. 3, the IAB-UE 201 is performing a registration process (e.g., the procedure 300) with respect to an IAB network, including connecting with an IAB-donor 203, an AMF 205, an EIR 401, an AUSF 213 and a UDM 210. The procedure 300 includes the AMF 205 authorizing whether the IAB-UE 201 can connect to the IAB network.

In the present embodiment, the AMF 205 determines whether the IAB-UE 201 is authorized to connect to the IAB network by checking stored authentication information, the authentication information mapping allowable IAB nodes. At 301, the AMF can be preconfigured with mapping information, the mapping information including, but not limited to, UICC credentials of pre-authorized IAB-UEs, pre-authorized IAB-ME identities, and pre-authorized location information and cell identity information related to the cell in which the IAB-UE 201 is camping. This mapping information can be preconfigured via Operations, Administration and Maintenance (OAM) or provided for by UDM 210.

At 302, IAB-UE 201 can send a Registration Request to IAB-donor 203. The Registration Request can contain credentials in UICC such as but not limited to SUCI, 5G-GUTI and so on. At 304, the IAB-donor 203 can send an N2 message to the AMF 205. The N2 message can include credentials in UICC and both location information and cell identity information related to the cell in which the IAB-UE 201 is camping. At 306, the AMF 205 can authenticate the credentials that have been received from the IAB-donor 203, for example, in a manner similar to step 9 in TS 23.502 clause 4.2.2.2.2. In some embodiments, at 307, in response to the AMF 205 determining that the AMF 205 does not hold (e.g., does not store in a local memory of the AMF 205) the PEI of the IAB-UE 201, the AMF 205 can send an identity request message to the IAB-UE 201 in a manner similar to step 11 in TS 23.502 clause 4.2.2.2.2. The IAB-UE 201 can respond to the AMF 205 identity request message with an identity response, which includes the PEI of the IAB-UE 201. In other embodiments, the AMF 205 holds (e.g., stores in a local memory of the AMF 205) the PEI of the IAB-UE 201.

In some embodiments, at 308, the AMF 205 can begin an IAB-ME identity check using the identity response message from the IAB-UE 201, for example, in a manner similar to step 12 in TS 23.502 clause 4.2.2.2.2.

At 309, based on operator policy, the AMF 205 can check one or more of the IAB-UE 201 identification information against the mapping information stored in the AMF 205. In some embodiments, the AMF 205 can check the received credentials in the UICC (e.g., received from the IAB-donor 203 in the N2 message at 304) and the IAB-ME identity against the stored mapping of the credentials in UICC and the IAB-ME identities. In some embodiments, the AMF 205 can check the received credentials in the UICC, the IAB-ME identity, and the location information related to the cell in which the IAB-UE 201 is camping (e.g., received from IAB-donor 203 in the N2 message at 304) against the stored mapping information of the credentials in the UICC, the IAB-ME identities, and the location information related to the cells in which the IAB-UE 201 is camping. In some embodiments, the AMF 205 can check the received credentials in the UICC, the IAB-ME identity, and both the location information and cell identity information related to the cell in which the IAB-UE 201 is camping (e.g., received from the IAB-donor 203 in the N2 message at 304) against the stored mapping information of the credentials in UICC, the IAB-ME identities, and both the location information and cell identity information related to the cells in which the IAB-UE 201 is camping.

In some embodiments, the AMF 205 can check the received credentials in the UICC, the IAB-ME identity, and both the location information and cell identity information related to the cell in which the IAB-UE 201 is camping (e.g., received from the IAB-donor 203 in the N2 message at 304) against the stored mapping information of the credentials in UICCs, the IAB-ME identities, and both the location information and cell identity information related to the cells in which the IAB-UE 201 is camping.

In one embodiment, when the AMF 205 checks the mapping information against the IAB-UE 201 identification information (e.g., the information received from IAB-donor 203 in the N2 message at 304), the AMF 205 determines whether the stored information matches the IAB-UE 201 identification information received from the IAB-donor in the N2 message at 304.

In one embodiment, the AMF 205 can match the stored credentials in UICC and IAB-ME identity information to the IAB-UE 201 identification information received from the IAB-donor 203 in the N2 message at 304 such as the credentials in UICC and IAB-ME identity information. In one embodiment the AMF 205 can match the stored credentials in UICC, IAB-ME identity information, and location information to the IAB-UE 201 identification information received from the IAB-donor 203 in the N2 message at 304 such as the credentials in UICC, IAB-ME identity information, and location information related to the cell in which the IAB-UE 201 is camping. In one embodiment the AMF 205 can match the stored credentials in UICC, IAB-ME identity information, and both location information and cell identity information related to the cell in which the IAB-UE 201 is camping, to the IAB-UE 201 identification information received from the IAB-donor in the N2 message at 304, such as the credentials in UICC, IAB-ME identity information, and both location information and cell identity information related to the cell in which the IAB-UE 201 is camping.

In response to the IAB-UE 201 identification information matching the stored mapping information, the AMF 205 can determine that the mapping was successful and that IAB-UE 201 is authorized to connect to the network. In response to the IAB-UE 201 identification information not matching the stored mapping information, the AMF 205 can determine that the mapping was not successful and that the IAB-UE 201 is not authorized to connect to the network.

In response to the AMF 205 determining that the mapping was successful, at 310, the AMF 205 can send a Registration Accept to the IAB-donor 203, the IAB-donor 203 relaying the AMF 205 response to the IAB-UE 201. Upon receiving the Registration Accept, the IAB-UE 201 is authorized to connect to the network. In other embodiments, in response to the AMF 205 determining that the mapping was not successful, the AMF 205 can send a rejection response to the IAB-donor 203, the IAB-donor 203 relaying the AMF 205 response to the IAB-UE 201. Upon receiving a rejection response to the Registration Request at 302, the IAB-UE 201 is not authorized to connect to the network.

Figure 4:
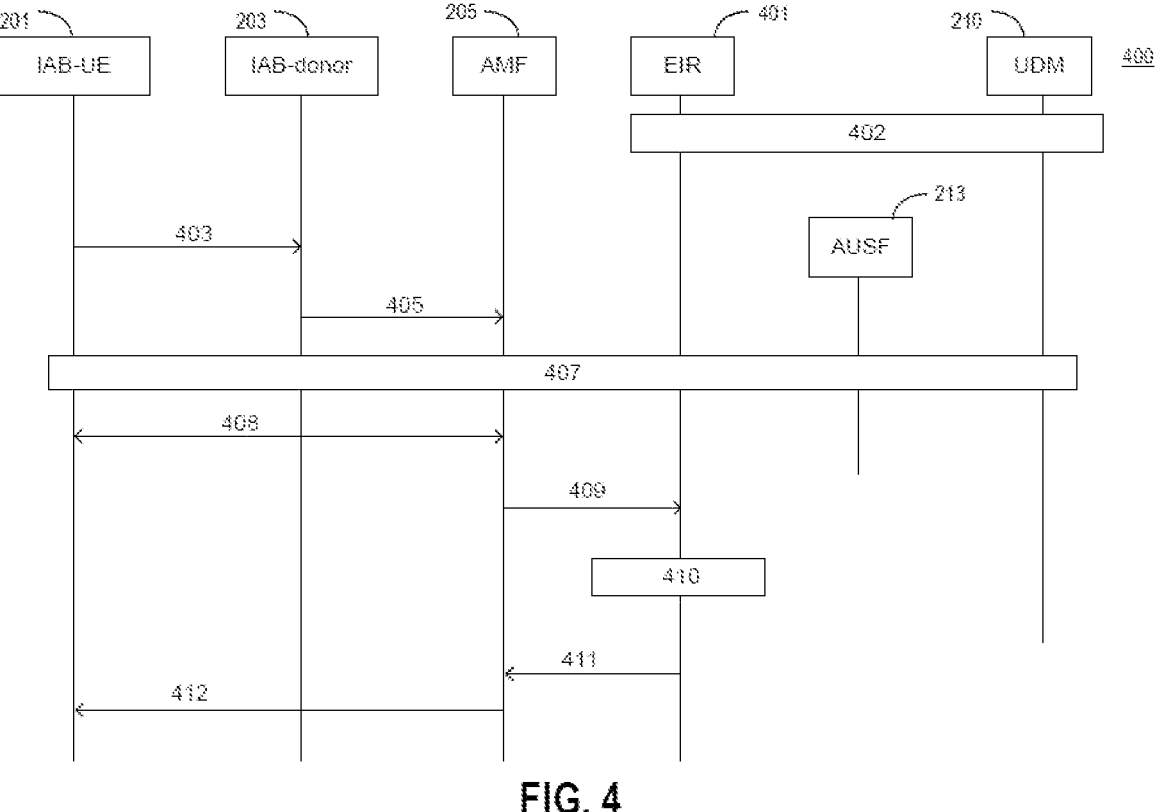
FIG. 4 is a signal diagram illustrating an example procedure for authenticating an IAB-UE via an Equipment Identity Register (EIR), according to some embodiments of the present disclosure.

FIG. 4 is a signal diagram illustrating an example procedure 400 for authenticating an IAB-UE 201 via an EIR 401, according to some embodiments of the present disclosure.

Referring to FIG. 4, the IAB-UE 201 is performing a registration process (e.g., the procedure 400) with respect to an IAB network, including connecting with an IAB-donor 203, an AMF 205, an EIR 401, an AUSF 213, and a UDM 210. The procedure 300 includes the EIR 401 authorizing whether the IAB-UE 201 can connect to the IAB network.

In the present embodiment, EIR 401 determines whether the IAB-UE 201 is authorized to connect to the IAB network by checking the stored authentication information, the authentication information mapping allowable IAB nodes. At 402, the EIR 401 can be preconfigured with mapping information, the mapping information including, but not limited to UICC credentials of pre-authorized IAB-UEs, pre-authorized IAB-ME identities, and pre-authorized location information and cell identity information related to the cell in which the IAB-UE 201 is camping. This mapping information can be preconfigured via OAM or provided for by UDM 210.

At 403, IAB-UE 201 can send a Registration Request to IAB-donor 203. The Registration Request can contain credentials in UICC such as but not limited to SUCI, 5G-GUTI and so on. At 405, the IAB-donor 203 can send an N2 message to the AMF 205. The N2 message can include credentials in UICC and both location information and cell identity information related to the cell in which the IAB-UE 201 is camping. At 407, the AMF 205 can authenticate the credentials that have been received from the IAB-donor 203, for example, in a manner similar to step 9 in TS 23.502 clause 4.2.2.2.2. In some embodiments, at 408, in response to the AMF 205 determining that the AMF 205 does not hold (e.g., does not store in a local memory of the AMF 205) the PEI of the IAB-UE 201, the AMF 205 can send an identity request message to the IAB-UE 201 in a manner similar to step 11 in TS 23.502 clause 4.2.2.2.2. The IAB-UE 201 can respond to the AMF 205 identity request message with an identity response, which includes the PEI of the IAB-UE 201. In other embodiments, the AMF 205 holds (e.g., stores in a local memory of the AMF 205) the PEI of the IAB-UE 201.

At 409, the AMF 205 can send N5g-eir_EquipmentIdentityCheck request to EIR 401, where the N5g-eir_EquipmentIdentityCheck request can contain information related to the credentials in UICC, the IAB-ME identity, and both location information and cell identity information related to the cell in which the IAB-UE 201 is camping. At 410, the EIR 401 can check the IAB-ME identity according to its own register, and, based on operator policy, the EIR 401 can additionally check the authentication information of IAB-UE 201.

The EIR 401 can check one or more of the IAB-UE 201 identification information received from the AMF 205 at 409 against the mapping information stored in the EIR 401. In some embodiments, the EIR 401 can check the received credentials in the UICC and the IAB-ME identity (e.g., received from the AMF 205 at 409) against the stored mapping of the credentials in the UICC and the IAB-ME identities. In some embodiments, the EIR 401 can check the received credentials in the UICC, the IAB-ME identity, and the location information related to the cell in which the IAB-UE 201 is camping (e.g., received from the AMF 205 at 409) against the stored mapping information of the credentials in UICC, the IAB-ME identities, and the location information related to the cells in which the IAB-UE 201 is camping. In some embodiments, the EIR 401 can check the received credentials in the UICC, the IAB-ME identity, and both the location information and cell identity information related to the cell in which the IAB-UE 201 is camping (e.g., received from the AMF 205 at 409) against the stored mapping information of the credentials in UICC, the IAB-ME identities, and both the location information and cell identity information related to the cells in which the IAB-UE 201 is camping.

In one embodiment, when the EIR 401 checks the mapping information against the IAB-UE 201 identification information (e.g., the information received from the AMF 205 at 409), the EIR 401 determines whether the stored information matches the IAB-UE 201 identification information received from the AMF 205 at 409.

In one embodiment, the EIR 401 can match the stored credentials in UICC and IAB-ME identity information to the IAB-UE 201 identification information received from the AMF 205 at 409 such as the credentials in UICC and IAB-ME identity information. In one embodiment the EIR 401 can match the stored credentials in UICC, IAB-ME identity information, and location information to the IAB-UE 201 identification information received from the AMF 205 at 409 such as the credentials in UICC, IAB-ME identity information, and location information related to the cell in which the IAB-UE 201 is camping. In one embodiment the EIR 401 can match the stored credentials in UICC, IAB-ME identity information, and both location information and cell identity information related to the cell in which the IAB-UE 201 is camping, to the IAB-UE 201 identification information received from the AMF 205 at 409 such as the credentials in UICC, IAB-ME identity information, and both location information and cell identity information related to the cell in which the IAB-UE 201 is camping.

In response to the IAB-UE 201 identification information matching the stored mapping information, the EIR 401 can determine that the mapping was successful and that IAB-UE 201 is authorized to connect to the network. In response to the IAB-UE 201 identification information not matching the stored mapping information, the EIR 401 can determine that the mapping was not successful and that the IAB-UE 201 is not authorized to connect to the network.

At 411, the EIR 401 can send to the AMF 205 an N5g-eir_EqiupmentIdentityCheck response indicating the success or failure of the mapping of the IAB-UE information. In some embodiments, in response to the EIR 401 determining that the mapping is successful, at 412, the AMF 205 can send a Registration Accept to the IAB-donor 203, the IAB-donor 203 relaying the EIR 401 response to the IAB-UE 201. Upon receiving the Registration Accept, the IAB-UE 201 is authorized to connect to the network. In other embodiments, in response to the EIR 401 determining that the mapping was not successful, the AMF 205 can send a rejection response to the IAB-donor 203, the IAB-donor 203 relaying the EIR 401 response to the IAB-UE 201. Upon receiving a rejection response to the Registration Request at 403, the IAB-UE 201 is not authorized to connect to the network.

Figure 5:
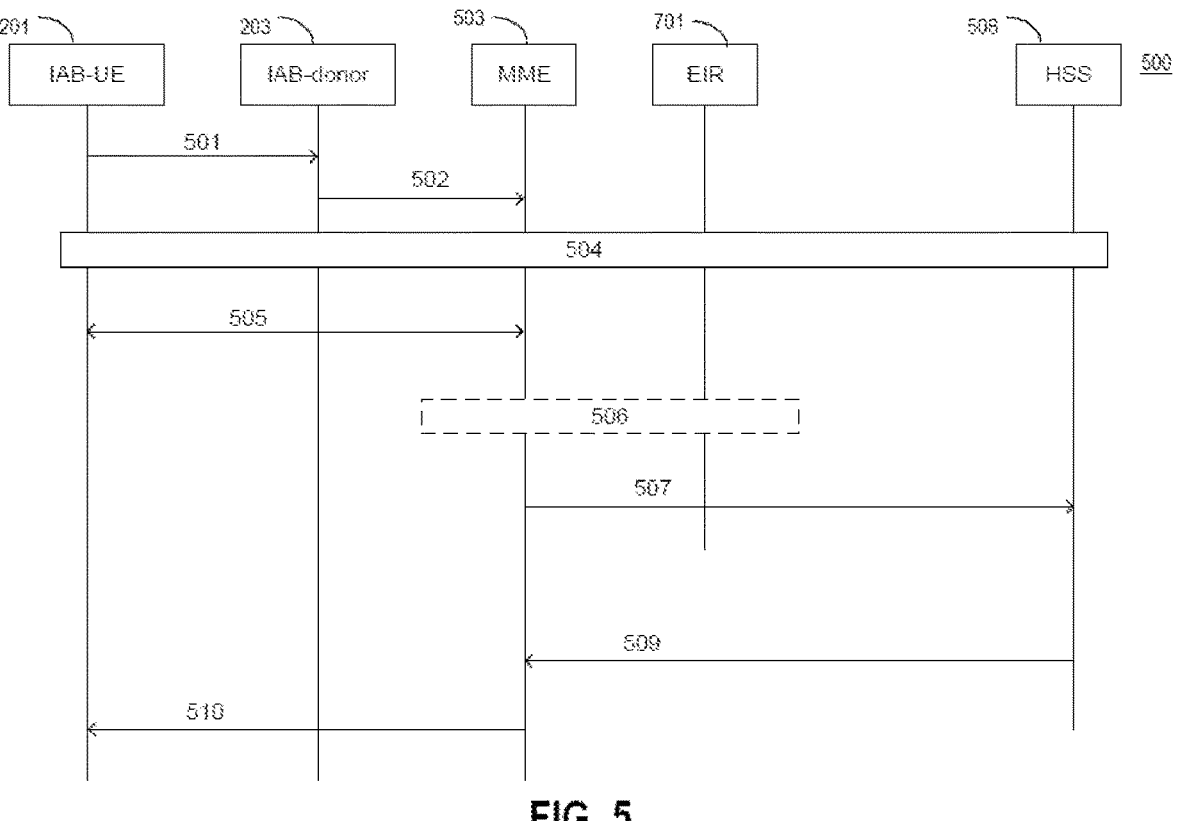
FIG. 5 is a signal diagram illustrating an example procedure for authenticating an IAB-UE via a Home Subscriber Server (HSS), according to some embodiments of the present disclosure.

FIG. 5 is a signal diagram illustrating an example procedure 500 for authenticating an IAB-UE 201 via a Home Subscriber Server (HSS), according to some embodiments of the present disclosure. The HSS stores user and subscription information for access to networks, such as EPS networks. Referring to FIG. 5, the IAB-UE 201 is performing a registration process (e.g. the procedure 500) with respect to an IAB network, including connecting with an IAB-donor 203, a Mobile Management Entity (MME) 503, an EIR 701 and an HSS 508. MMEs can, among other functions, choose the server gateway protocol for each UE at an initial attachment to the network, or, when nodes relocate to/from the network, the MME can authenticate UEs by interacting with HSS. The procedure 500 includes the HSS 508 authorizing whether the IAB-UE 201 can connect to the IAB network.

At 501, IAB-UE 201 sends an Attach Request to IAB-donor 203. The Attach Request can contain credentials in UICC such as but not limited to International Mobile Subscriber Identity (IMSI), Globally Unique Temporary Identity (GUTI) and so on. At 502, the IAB-donor 203 can send a S1-MME message to MME 503. The S1-MME message can include credentials in UICC and both location information and cell identity information related to the cell in which the IAB-UE 201 is camping. At 504, the MME 503 can authenticate the credentials that have been received from the IAB-donor 203, for example, in a manner similar to step 5a in TS 23.401 clause 5.3.2.1. In some embodiments, at 505, in response to the MME determining that the MME 503 does not hold (e.g., does not store in a local memory of the MME 503) the IAB-ME identity (International Mobile Equipment Identity (IMEI)) of IAB-UE 201, the MME 503 can send an identity request message to the IAB-UE 201 in a manner similar to step 5b in TS 23.401 clause 5.3.2.1. The IAB-UE 201 can respond to the MME 503 identity request message with an identity response, which includes the IMEI of the IAB-UE 201. In other embodiments, the MME 503 holds (e.g., stores in a local memory of the MME 503) the IMEI of the IAB-ME 201.

In some embodiments, at 506, the MME 503 can begin an IAB-ME identity check using the identity response message from the IAB-UE 201, for example, in a manner similar to step 5b in TS 23.401 clause 5.3.2.1. At 507, the MME 503 can send a Notify Request to HSS 508, where the Notify Request can contain information related to the credentials in UICC, the IAB ME identity, and both location information and cell identity information related to the cell in which the IAB-UE 201 is camping. Based on operator policy, the HSS 508 can check one or more of the IAB-UE 201 identification information received at 507 from MME 503, against the mapping information stored in the HSS 508. In some embodiments, the HSS 508 can check the received credentials in the UICC and the IAB-ME identity (e.g., received from the MME 503 at 507) against the stored mapping of the credentials in UICC and IAB-ME identities. In some embodiments, the HSS 508 can check the received credentials in the UICC, the IAB-ME identity, and the location information related to the cell in which the IAB-UE 201 is camping (e.g., received from the MME 503 at 507) against the stored mapping information of the credentials in UICC, the IAB-ME identities, and the location information related to the cells in which the IAB-UE 201 is camping. In some embodiments, the HSS 508 can check the received credentials in the UICC, the IAB-ME identity, and both the location information and cell identity information related to the cell in which the IAB-UE 201 is camping (e.g. received from the MME 503 at 507) against the stored mapping information of the credentials in UICC, the IAB-ME identities, and both the location information and cell identity information related to the cells in which the IAB-UE 201 is camping.

In one embodiment, when the HSS 508 checks the mapping information against the IAB-UE 201 identification information (e.g., the information received from the MME 503 at 507), the HSS 508 determines whether the stored information matches the IAB-UE 201 identification information received from the MME 503 at 507.

In one embodiment, the HSS 508 can match the stored credentials in UICC and IAB-ME identity information to the IAB-UE 201 identification information received from the MME 503 at 507 such as the credentials in UICC and IAB-ME identity information. In one embodiment the HSS 508 can match the stored credentials in UICC, IAB-ME identity information, and location information to the IAB-UE 201 identification information received from the MME 503 at 507 such as the credentials in UICC, IAB-ME identity information, and location information related to the cell in which the IAB-UE 201 is camping. In one embodiment the HSS 508 can match the stored credentials in UICC, IAB-ME identity information, and both location information and cell identity information related to the cell in which the IAB-UE 201 is camping, to the IAB-UE 201 identification information received from the MME 503 at 507 such as the credentials in UICC, IAB-ME identity information, and both location information and cell identity information related to the cell in which the IAB-UE 201 is camping.

Figure 6:
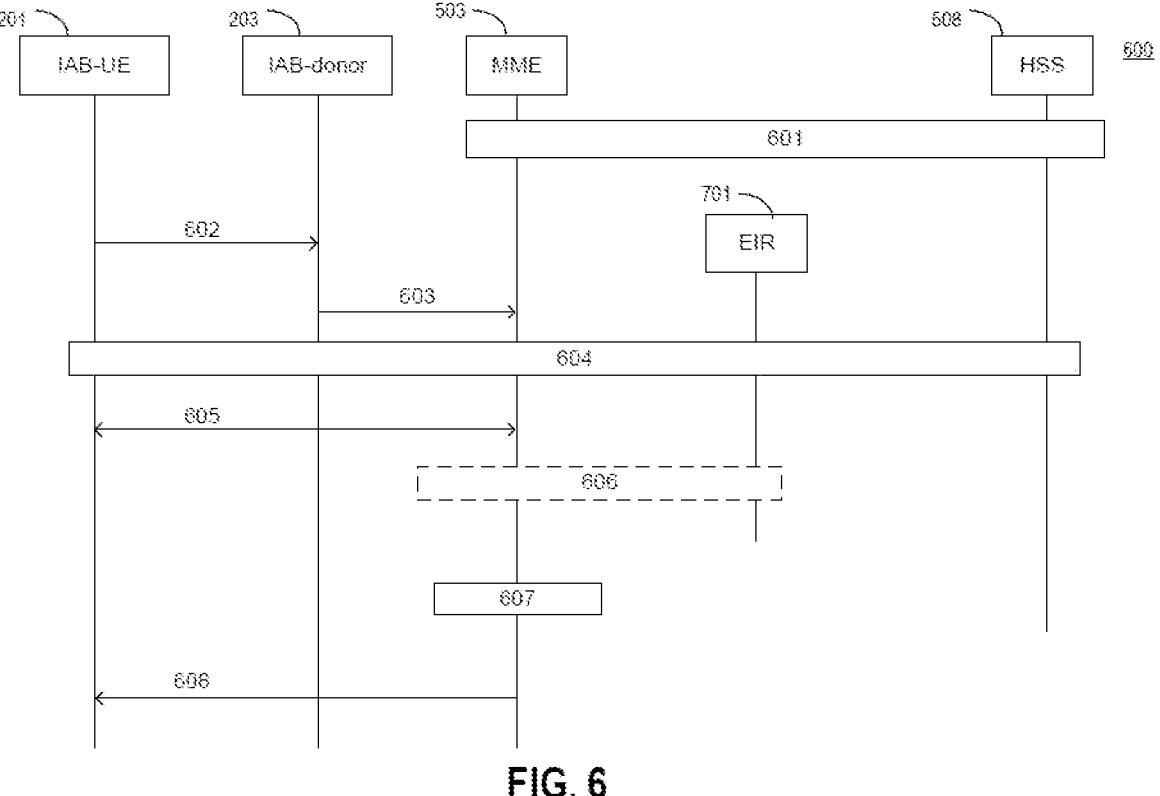
FIG. 6 is a signal diagram illustrating an example procedure for authenticating an IAB-UE via Mobility Management Entity (MME), according to some embodiments of the present disclosure.

In response to the IAB-UE 201 identification information matching the stored mapping information, the HSS 508 can determine that the mapping was successful and that IAB-UE 201 is authorized to connect to the network. In response to the IAB-UE 201 identification information not matching the stored mapping information, the HSS 508 can determine that the mapping was not successful and that the IAB-UE 201 is not authorized to connect to the network At 509, the HSS 508 can send a Notify Response to the MME 503 indicating the success or failure of the mapping of the IAB-UE information. In some embodiments, in response to the HSS 508 determining that the mapping was successful, at 509, the MME 503 can send an Attach Accept to the IAB-donor 203, the IAB-donor 203 relaying the HSS 508 response to the IAB-UE 201. Upon receiving the Attach Accept, the IAB-UE 201 is authorized to connect to the network. In other embodiments, in response to the HSS 508 determining that the mapping was not successful, the MME 503 can send a rejection response to the IAB-donor 203, the IAB-donor 203 relaying the HSS 508 response to the IAB-UE 201. Upon receiving a rejection response to the Attach Request at 501, the IAB-UE 201 is not authorized to connect to the network, FIG. 6 is a signal diagram illustrating an example procedure 600 for authenticating an IAB-UE 201 via a MME 503, according to some embodiments of the present disclosure. Referring to FIG. 6, the IAB-UE is performing a registration process (e.g., the procedure 600) with respect to an IAB network, including connecting with an IAB-donor 203, an MME 503, an EIR 701, and an HSS 508. The procedure 600 includes the MME 503 authorizing whether the IAB-UE 201 can connect to the IAB network.

In the present embodiment, the MME 503 determines whether the IAB-UE 201 is authorized to connect to the IAB network by checking stored authentication information, the authentication information mapping IAB nodes. At 601, the MME 503 can be preconfigured with mapping information, the mapping information including, but not limited to UICC credentials of pre-authorized IAB-UEs, pre-authorized IAB-ME identities, and pre-authorized location information and cell identity information related to the cell in which the IAB-UE 201 is camping. This mapping information can be preconfigured via OAM or provided for by HSS 508.

At 602, IAB-UE 201 sends an Attach Request to IAB-donor 203. The Attach Request can contain credentials in UICC such as but not limited to IMSI, GUTI and so on. At 603, the IAB-donor 203 can send a S1-MME message to MME 503. The S1-MME message can include credentials in UICC and both location information and cell identity information related to the cell in which the IAB-UE 201 is camping. At 604, the MME 503 can authenticate the credentials that have been received from the IAB-donor 203, for example, in a manner similar to step 5a in TS 23.401 clause 5.3.2.1. In some embodiments, at 605, in response to the MME 503 determining that MME 503 does not hold (e.g., does not store in a local memory of the MME 503) the IMEI of IAB-UE 201, the MME 503 can send an identity request message to the IAB-UE 201 in a manner similar to step 5b in TS 23.401 clause 5.3.2.1. The IAB-UE 201 can respond to the MME 503 identity request message with an identity response, which includes the IMEI of the IAB-UE 201. In other embodiments, the MME 503 holds (e.g., stores in a local memory of the MME 503) the IMEI of the IAB-UE 201.

In some embodiments, at 606, the MME 503 can begin an IAB-ME identity check using the identity response message from the IAB-UE 201, for example, in a manner similar to step 5b in TS 23.401 clause 5.3.2.1.

At 607, based on operator policy, the MME 503 can check one or more of the IAB-UE 201 identification information against the mapping information stored in the MME 503. In some embodiments, the MME 503 can check the received credentials in the UICC (e.g., received from the IAB-donor 203 in the S1-MME message at 603) and the IAB-ME identity against the stored mapping of the credentials in UICCs and the IAB-ME identities. In some embodiments, the MME 503 can check the received credentials in the UICC, the IAB-ME identity, and the location information related to the cell in which the IAB-UE 201 is camping (e.g., received from the IAB-donor 203 in the S1-MME message at 603) against the stored mapping information of the credentials in the UICC, the IAB-ME identities, and the location information related to the cells in which the IAB-UE 201 is camping. In some embodiments, the MME 503 can check the received credentials in the UICC, the IAB-ME identity, and both the location information and cell identity information related to the cell in which the IAB-UE 201 is camping (e.g., received from the IAB-donor 203 in the S1-MME message at 603) against the stored mapping information of the credentials in UICC, the IAB-ME identities, and both the location information and cell identity information related to the cells in which the IAB-UE 201 is camping.

In some embodiments, the MME 503 can check the received credentials in the UICC, the IAB-ME identity, and both the location information and cell identity information related to the cell in which the IAB-UE 201 is camping (e.g., received from the IAB-donor 203 in the S1-MME message at 603) against the stored mapping information of the credentials in UICC, the IAB-ME identities, and both the location information and cell identity information related to the cells in which the IAB-UE 201 is camping.

In one embodiment, when the MME 503 checks the mapping information against the IAB-UE 201 identification information (e.g., the information received from IAB-donor 203 in the S1-MME message at 603), the MME 503 determines whether the stored information matches the IAB-UE 201 identification information received from the IAB-donor in the S1-MME message at 603.

In one embodiment, the MME 503 can match the stored credentials in UICC and IAB-ME identity information to the IAB-UE 201 identification information received from the IAB-donor 203 in the S1-MME message at 603 such as the credentials in UICC and IAB-ME identity information. In one embodiment the MME 503 can match the stored credentials in UICC, IAB-ME identity information, and location information to the IAB-UE 201 identification information received from the IAB-donor 203 in the S1-MME message at 603 such as the credentials in UICC, IAB-ME identity information, and location information related to the cell in which the IAB-UE 201 is camping. In one embodiment the MME 503 can match the stored credentials in UICC, IAB-ME identity information, and both location information and cell identity information related to the cell in which the IAB-UE 201 is camping, to the IAB-UE 201 identification information received from the IAB-donor in the S1-MME message at 603, such as the credentials in UICC, IAB-ME identity information, and both location information and cell identity information related to the cell in which the IAB-UE 201 is camping.

In response to the IAB-UE 201 identification information matching the stored mapping information, the MME 503 can determine that the mapping was successful and that IAB-UE 201 is authorized to connect to the network. In response to the IAB-UE 201 identification information not matching the stored mapping information, the MME 503 can determine that the mapping was not successful and that the IAB-UE 201 is not authorized to connect to the network.

In response to the MME 503 determining that the mapping was successful, at 608, the MME 503 can send an Attach Accept to the IAB-donor 203, the IAB-donor 203 relaying the MME 503 response to the IAB-UE 201. Upon receiving the Attach Accept, the IAB-UE 201 is authorized to connect to the network. In other embodiments, in response to the MME 503 determining that the mapping was not successful, the MME 503 can send a rejection response to the IAB-donor 203, the IAB-donor 203 relaying the MME 503 response to the IAB-UE 201. Upon receiving a rejection response to the Attach Request at 602, the IAB-UE 201 is not authorized to connect to the network.

Figures 7, 8:
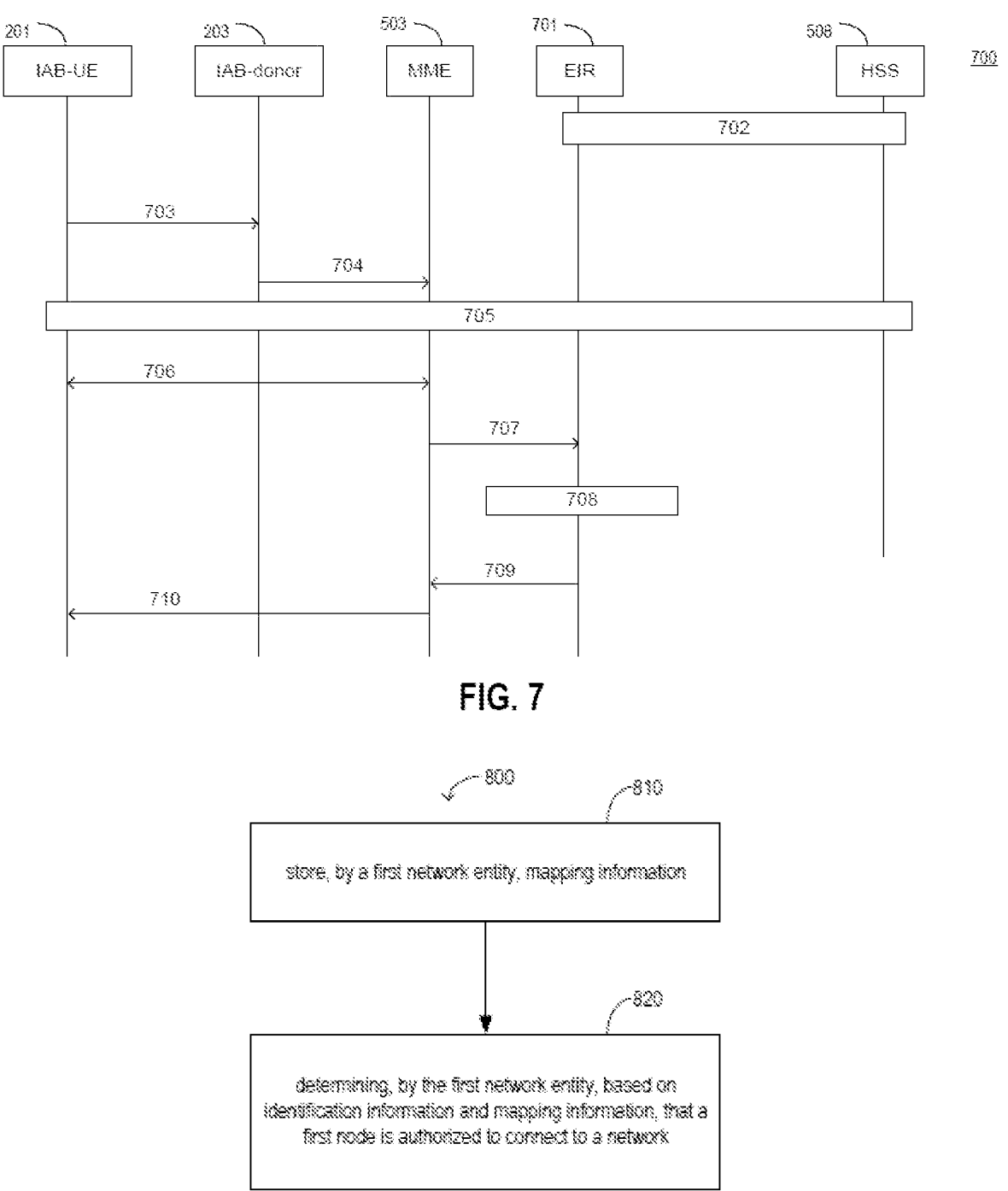
FIG. 7 is a signal diagram illustrating an example procedure for authenticating an IAB-UE via an EIR, according to some embodiments of the present disclosure.
FIG. 8 is a flow diagram illustrating an example method for determining node authentication and access to a network, in accordance with an embodiment of the present disclosure.

FIG. 7 is a signal diagram illustrating an example procedure 700 for authenticating an IAB-UE 201 via an EIR 701 according to some embodiments of the present disclosure. Referring to FIG. 7, the IAB-UE is performing a registration process (e.g., the procedure 400) with respect to an IAB network, including connecting with an IAB-donor 203, an MME 503, an EIR 701, and a HSS 508. The procedure 700 includes the EIR 701 authenticating whether the IAB-UE can connect to the IAB network.

In the present embodiment, EIR 701 determines whether the IAB-UE 201 is authorized to connect to the IAB network by checking the stored authentication information, the authentication information mapping allowable IAB nodes. At 702, the EIR 701 can be preconfigured with mapping information, the mapping information including, but not limited to UICC credentials of pre-authorized IAB-UEs, pre-authorized IAB-ME identities, and pre-authorized location information and cell identity information related to the cell in which the IAB-UE 201 is camping. This mapping information can be preconfigured via OAM or provided for by HSS 508.

At 703, IAB-UE 201 can send an Attach Request to IAB-donor 203. The Attach Request can contain credentials in UICC such as but not limited to IMSI, GUTI and so on. At 704, the IAB-donor 203 can send a S1-MME message to MME 503. The S1-MME message can include credentials in UICC and both location information and cell identity information related to the cell in which the IAB-UE 201 is camping. At 705, the MME 503 can authenticate the credentials that have been received from the IAB donor-203, for example, in a manner similar to step 5a in TS 23.401 clause 5.3.2.1. In some embodiments, at 706, in response to the MME 503 determining that MME 503 does not hold (e.g., does not store in a local memory of the MME 503) the IMEI of IAB-UE 201, the MME 503 can send an identity request message to the IAB-UE 201 in a manner similar to step 5b in TS 23.401 clause 5.3.2.1. The IAB-UE 201 can respond to the MME 503 identity request message with an identity response which includes the IMEI of the IAB-UE 201. In other embodiments, the MME 503 holds (e.g., stores in a local memory of the MME 503) the IMEI of the IAB-UE 201.

At 707, the MME 503 can send ME Identity Check request to EIR 701, where the ME Identity Check request can contain information related to the credentials in UICC, the IAB-ME identity, and both location information and cell identity information related to the cell in which the IAB-UE 201 is camping. At 708, the EIR 701 can check the IAB-ME identity according to its own register, and, based on operator policy, the EIR 701 can additionally check the authentication information of IAB-UE 201.

The EIR 701 can check one or more of the IAB-UE 201 identification information received from the MME 503 at 707 against the mapping information stored in the EIR 401. In some embodiments, the EIR 701 can check the received credentials in the UICC and the IAB-ME identity (e.g., received from the MME 503 at 707) against the stored mapping of the credentials in the UICCs and the IAB-ME identities. In some embodiments, the EIR 701 can check the received credentials in the UICC, the IAB-ME identity, and the location information related to the cell in which the IAB-UE 201 is camping (e.g., received from the MME 503 at 707) against the stored mapping information of the credentials in UICC, the IAB-ME identities, and the location information related to the cells in which the IAB-UE 201 is camping. In some embodiments, the EIR 701 can check the received credentials in the UICC, the IAB-ME identity, and both the location information and cell identity information related to the cell in which the IAB-UE 201 is camping (e.g., received from the MME 503 at 707) against the stored mapping information of the credentials in UICC, the IAB-ME identities, and both the location information and cell identity information related to the cells in which the IAB-UE 201 is camping.

In one embodiment, when the EIR 701 checks the mapping information against the IAB-UE 201 identification information (e.g., the information received from the MME 503 at 707), the EIR 701 determines whether the stored information matches the IAB-UE 201 identification information received from the MME 503 at 707.

In one embodiment, the EIR 701 can match the stored credentials in UICC and IAB-ME identity information to the IAB-UE 201 identification information received from the MME 503 at 707 such as the credentials in UICC and IAB-ME identity information. In one embodiment the EIR 701 can match the stored credentials in UICC, IAB-ME identity information, and location information to the IAB-UE 201 identification information received from the MME 503 at 707 such as the credentials in UICC, IAB-ME identity information, and location information related to the cell in which the IAB-UE 201 is camping. In one embodiment the EIR 701 can match the stored credentials in UICC, IAB-ME identity information, and both location information and cell identity information related to the cell in which the IAB-UE 201 is camping, to the IAB-UE 201 identification information received from the MME 503 at 707 such as the credentials in UICC, IAB-ME identity information, and both location information and cell identity information related to the cell in which the IAB-UE 201 is camping.

In response to the IAB-UE 201 identification information matching the stored mapping information, the EIR 701 can determine that the mapping was successful and that IAB-UE 201 is authorized to connect to the network. In response to the IAB-UE 201 identification information not matching the stored mapping information, the EIR 701 can determine that the mapping was not successful and that the IAB-UE 201 is not authorized to connect to the network.

At 709, the EIR 701 can send to the MME 503 an ME Identity Check response indicating the success or failure of the mapping of the IAB-UE information. In some embodiments, in response to the EIR 701 determining that the mapping is successful, at 710, the MME 503 can send an Attach Accept to the IAB-donor 203, the IAB-donor 203 relaying the EIR 701 response to the IAB-UE 201. Upon receiving the Attach Accept, the IAB-UE 201 is authorized to connect to the network. In other embodiments, in response to the EIR 701 determining that the mapping is not successful, the MME 503 can send a rejection response to the IAB-donor 203, the IAB-donor 203 relaying the EIR 701 response to the IAB-UE 201. Upon receiving a rejection response to the Attach Request at 703, the IAB-UE 201 is not authorized to connect to the network.

FIG. 8 is a flow diagram illustrating an example method for determining node authentication and access to a network, in accordance with an embodiment of the present disclosure. Referring to FIGS. 1-7, the method 800 can be performed by different network entities, including but not limited to the UDM 210 (as shown in FIG. 2), AMF 503 (as shown in FIG. 3), EIR 401/701 (as shown in FIGS. 4 and 7), HSS 508 (as shown in FIG. 5), and MME 503 (as shown in FIG. 6).

At 810, a wireless communication method, includes storing, by a first network entity, mapping information.

In some examples, as shown in FIGS. 2, 4, 5 and 7, a second network entity receives, from a second node, credentials of the first node, location information of the cell, and cell identity of the cell, and first network entity receives from the second network entity, the credentials of the first node, the identification information of the first node, the location information of the cell, and the cell identity of the cell.

In some examples, as shown in FIG. 2, the first network entity is UDM 210, the second network entity is an AMF 305, the first node is IAB-UE 201, and the second node is an IAB-donor 203.

In some examples, as shown in FIG. 4, the first network entity is EIR 401, the second network entity is an AMF 205, the first node is an IAB-UE 201, and the second node is an IAB-donor 203. The mapping information can be preconfigured via OAM or received from UDM 210.

In some examples, as shown in FIG. 5, the first network entity is HSS 508, the second network entity is MME 503, the first node is IAB-UE 201, and the second node is IAB-donor 203.

In some examples, as shown in FIG. 7, the first network entity is EIR 701, the second network entity is MME 503, the first node is IAB-UE 201, and the second node is IAB-donor 203. The mapping information can be preconfigured via OAM or received from HSS 508.

In some examples, as shown in FIGS. 3 and 6, the first network entity can receive from a second node, the credentials of the first node, the location information of the cell, and the cell identity of the cell.

In some examples, as shown in FIG. 3, the mapping information can be preconfigured by OAM or received from a second network entity. The first network entity is AMF 205, the second network entity is UDM 210, the first node is IAB-UE 201, and the second node is IAB-donor 203.

In some examples, as shown in FIG. 6, the first network entity is MME 503, the IAB-UE is 201, and the second node is an IAB-donor 203. The mapping information can be preconfigured via OAM or received from HS 508.

At 820, the wireless communication method determines, by the first network entity, based on identification information and the mapping information, that a first node is authorized to connect to a network. The identification information includes one or more of credentials of the first node, identification information of the first node, location information of a cell in which the first node is camping, or cell identity of the cell. The credentials of the first node include credentials in a UICC of the first node and the identification information of the first node include an IAB-ME identity of the first node. In some examples, the mapping information maps credentials of a plurality of nodes to identification information of the plurality of nodes. In some examples, the mapping information maps credentials of a plurality of nodes, identification information of the plurality of nodes, and location information of a plurality of cells to each other. In some examples, the mapping information maps credentials of a plurality of nodes, identification information of the plurality of nodes, location information of a plurality of cells, and cell identities of the plurality of cells to each other.

Figure 9A:
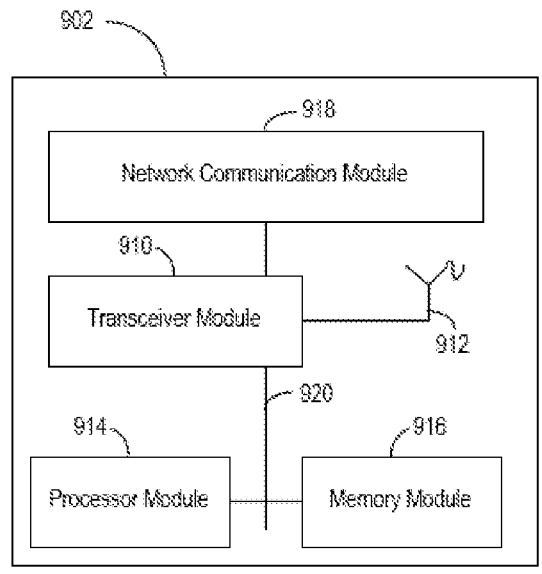
FIG. 9A illustrates a block diagram of an example base station, in accordance with some embodiments of the present disclosure.
Figure 9B:
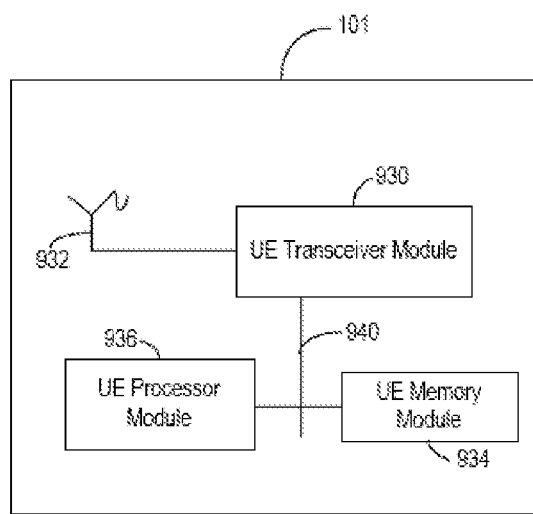
FIG. 9B illustrates a block diagram of an example a user equipment (UE), in accordance with some embodiments of the present disclosure.

FIG. 9A illustrates a block diagram of an example base station 902, in accordance with some embodiments of the present disclosure. FIG. 9B illustrates a block diagram of an example UE 101, in accordance with some embodiments of the present disclosure. For instance the UE may be an IAB node configured as an IAB-UE. Referring to FIGS. 1-9B, the base station 902 and the UE 101 can include components and elements configured to support known or conventional operating features that need not be described in detail herein. In one illustrative embodiment, the base station 902 and the UE 101 can be used to communicate (e.g., transmit and receive) data symbols in a wireless communication environment such as the network system architecture 100 and the registration procedures 200, 300, 400, 500, 600, 700 as described above. For instance, the base station 902 can be a base station (e.g., gNodeBs (gNBs), IAB node configured as a base station, or an IAB-DU, and so on), a server, a node, or any suitable computing device used to implement the NFs (e.g., the AMF 102, the SMF 106, the UPF 108, the UDM 112, the PCF 114, the AF 116, and so on) and to provide the networks 104, and 110.

The base station 902 includes a transceiver module 910, an antenna 912, a processor module 914, a memory module 916, and a network communication module 918. The module 910, 912, 914, 916, and 918 are operatively coupled to and interconnected with one another via a data communication bus 920. The UE 101 includes a UE transceiver module 930, a UE antenna 932, a UE memory module 934, and a UE processor module 936. The modules 930, 932, 934, and 936 are operatively coupled to and interconnected with one another via a data communication bus 940. The base station 902 communicates with the UE 101 or another base station via a communication channel, which can be any wireless channel or other medium suitable for transmission of data as described herein.

As would be understood by persons of ordinary skill in the art, the base station 902 and the UE 101 can further include any number of modules other than the modules shown in FIGS. 9A and 9B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver 930 includes a radio frequency (RF) transmitter and a RF receiver each including circuitry that is coupled to the antenna 932. A duplex switch (not shown) may alternatively couple the RF transmitter or receiver to the antenna in time duplex fashion. Similarly, in accordance with some embodiments, the transceiver 910 includes an RF transmitter and a RF receiver each having circuitry that is coupled to the antenna 912 or the antenna of another base station. A duplex switch may alternatively couple the RF transmitter or receiver to the antenna 912 in time duplex fashion. The operations of the two transceiver modules 910 and 930 can be coordinated in time such that the receiver circuitry is coupled to the antenna 932 for reception of transmissions over a wireless transmission link at the same time that the transmitter is coupled to the antenna 912. In some embodiments, there is close time synchronization with a minimal guard time between changes in duplex direction.

The UE transceiver 930 and the transceiver 910 are configured to communicate via the wireless data communication link, and cooperate with a suitably configured RF antenna arrangement 912/932 that can support a particular wireless communication protocol and modulation scheme. In some illustrative embodiments, the UE transceiver 910 and the transceiver 910 are configured to support industry standards such as the Long Term Evolution (LTE) and emerging 5G standards, and the like. It is understood, however, that the present disclosure is not necessarily limited in application to a particular standard and associated protocols. Rather, the UE transceiver 930 and the base station transceiver 910 may be configured to support alternate, or additional, wireless data communication protocols, including future standards or variations thereof.

The transceiver 910 and the transceiver of another base station (such as but not limited to, the transceiver 910) are configured to communicate via a wireless data communication link, and cooperate with a suitably configured RF antenna arrangement that can support a particular wireless communication protocol and modulation scheme. In some illustrative embodiments, the transceiver 910 and the transceiver of another base station are configured to support industry standards such as the LTE and emerging 5G standards, and the like. It is understood, however, that the present disclosure is not necessarily limited in application to a particular standard and associated protocols. Rather, the transceiver 910 and the transceiver of another base station may be configured to support alternate, or additional, wireless data communication protocols, including future standards or variations thereof.

In accordance with various embodiments, the base station 902 may be a base station such as but not limited to, an eNB, a serving eNB, a target eNB, an IAB-DU, a femto station, or a pico station, for example. The base station 902 can be an RN, a regular, a DeNB, a gNB, or an IAB donor. In some embodiments, the UE 101 may be embodied in various types of user devices such as a mobile phone, a smart phone, a personal digital assistant (PDA), tablet, laptop computer, wearable computing device, etc. The processor modules 914 and 936 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 914 and 936, respectively, or in any practical combination thereof. The memory modules 916 and 934 may be realized as RAM memory, flash memory, ROM memory, EPROM memory, EEPROM memory, registers, a hard disk, a removable disk, a CD-ROM, or any other form of storage medium known in the art. In this regard, memory modules 916 and 934 may be coupled to the processor modules 910 and 930, respectively, such that the processors modules 910 and 930 can read information from, and write information to, memory modules 916 and 934, respectively. The memory modules 916 and 934 may also be integrated into their respective processor modules 910 and 930. In some embodiments, the memory modules 916 and 934 may each include a cache memory for storing temporary variables or other intermediate information during execution of instructions to be executed by processor modules 910 and 930, respectively. Memory modules 916 and 934 may also each include non-volatile memory for storing instructions to be executed by the processor modules 910 and 930, respectively.

The network communication module 918 generally represents the hardware, software, firmware, processing logic, and/or other components of the base station 902 that enable bi-directional communication between the transceiver 910 and other network components and communication nodes in communication with the base station 902. For example, the network communication module 918 may be configured to support internet or WiMAX traffic. In a deployment, without limitation, the network communication module 918 provides an 802.3 Ethernet interface such that the transceiver 910 can communicate with a conventional Ethernet based computer network. In this manner, the network communication module 918 may include a physical interface for connection to the computer network (e.g., Mobile Switching Center (MSC)). In some embodiments in which the base station 902 is an IAB donor, the network communication module 918 includes a fiber transport connection configured to connect the base station 902 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While a UICC is described, the credentials can also be stored in other suitable memory devices of the IAB-UE, where examples of such other suitable memory devices can include, but are not limited to, virtual Subscriber Identity Module (SIM), internal storage, external storage (e.g., any externally connectable memory devices such as a memory card, flash memory device, circuitry containing memory, and so on), and SIM stored in the cloud.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module"), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
  storing, by a first network entity, mapping information comprising credentials and identification information of a plurality of nodes, wherein the identification information of the plurality of nodes comprises credentials of the respective plurality of nodes, Mobile Equipment (ME) identity information of the respective plurality of nodes, pre-authorized location information of one or more cells associated with the respective plurality of nodes, and cell identities of the one or more cells having the pre-authorized location information;
  receiving, by the first network entity from a first node, identification information of the first comprising credentials of the first node, ME identity information of the first node, location information of a cell in which the first node is camping, and a cell identity of the cell; wherein the first node is an Integrated Access Backhaul (IAB)-User Equipment (UE);
  comparing, by the first network entity, all of the identification information of the first node from the receiving step with all of the identification information of the plurality of nodes from the storing step; and
  determining, by the first network entity according to the identification information of the first node being compared with the identification information of the plurality of nodes, that:
    the first node is authorized to connect to a network based on the identification information of the first node matching all of the stored mapping information, wherein the mapping information maps the credentials of the plurality of nodes to the identification information of the plurality of nodes; or
    the first node is unauthorized to connect to the network based on at least a portion of the identification information of the first node not matching the stored mapping information.

2. The method of claim 1, wherein:
  the credentials of the first node comprise credentials in a Universal Integrated Circuit Card (UICC) of the first node,
  the pre-authorized location information comprising locations of the one or more cells at which each of the plurality of nodes is authorized for camping, and
  to determine whether the first node is authorized, comprises:
    comparing, by the first network entity, the identification information of the first node including the credentials of the first node, the ME identity information of the first node, the location information of the cell in which the first node is camping, and the cell identity of the cell to the stored identification information comprising the credentials of the respective plurality of nodes, the ME identity information of the respective plurality of nodes, the pre-authorized location information of one or more cells associated with the respective plurality of nodes, and the cell identities of the one or more cells; and
    determining, by the first network entity, that the first node is authorized to connect to the network based on matching the identification information of the first node matching the stored identification information; or
  determining, by the first network entity, that the first node is unauthorized to connect to the network based on the identification information of the first node mismatching at least the portion of the stored identification information.

3. The method of claim 1, further comprising receiving, by the first network entity from a second network entity, the credentials of the first node, the identification information of the first node, the location information of the cell, and the cell identity of the cell, wherein the second network entity receives the credentials of the first node, the location information of the cell, and the cell identity of the cell from a second node.

4. The method of claim 3, wherein the first network entity is an Unified Data Management (UDM);

the second network entity is an Access and Mobility Management function (AMF);

the first node is an Integrated Access Backhaul (IAB)-User Equipment (UE); and the second node is an IAB-donor.

5. The method of claim 3, wherein the first network entity is an Equipment Identity Register (EIR);

the second network entity is an Access and Mobility Management function (AMF);

the first node is an Integrated Access Backhaul (IAB)-User Equipment (UE); and the second node is an IAB-donor.

6. The method of claim 5, wherein the mapping information is preconfigured via Operations, Administration and Maintenance (OAM) or received from a Unified Data Management (UDM).

7. The method of claim 3, wherein the first network entity is a Home Subscriber Server (HSS);

the second network entity is a Mobility Management Entity (MME);

the first node is an Integrated Access Backhaul (IAB)-User Equipment (UE); and the second node is an IAB-donor.

8. The method of claim 3, wherein the first network entity is an Equipment Identity Register (EIR);

the second network entity is an Mobility Management Entity (MME);

the first node is an Integrated Access Backhaul (IAB)-User Equipment (UE); and the second node is an IAB-donor.

9. The method of claim 8, wherein the mapping information is preconfigured via Operations, Administration and Maintenance (OAM) or received from a Home Subscriber Server (HSS).

10. The method of claim 1, further comprising receiving, by the first network entity from a second node, the credentials of the first node, the location information of the cell, and the cell identity of the cell.

11. The method of claim 10, wherein the mapping information is preconfigured via Operations, Administration and Maintenance (OAM) or received from a second network entity.

12. The method of claim 11, wherein the first network entity is an Access and Mobility Management function (AMF);

the second network entity is an Unified Data Management (UDM);

the first node is an Integrated Access Backhaul (IAB)-User Equipment (UE); and the second node is an IAB-donor.

13. The method of claim 8, wherein the first network entity is a Mobility Management Entity (MME);

the first node is an Integrated Access Backhaul (IAB)-User Equipment (UE); and the second node is an IAB-donor.

14. The method of claim 13, wherein the mapping information is preconfigured via Operations, Administration and Maintenance (OAM) or received from a Home Subscriber Server (HSS).

15. The method of claim 1, wherein the mapping information maps credentials of a plurality of nodes to identification information of the plurality of nodes.

16. The method of claim 1, wherein the mapping information maps credentials of a plurality of nodes, identification information of the plurality of nodes, and location information of a plurality of cells to each other.

17. The method of claim 1, wherein the mapping information maps credentials of a plurality of nodes, identification information of the plurality of nodes, location information of a plurality of cells, and cell identities of the plurality of cells to each other.

18. A network entity, comprising:

at least one processor configured to:

store mapping information comprising credentials and identification information of a plurality of nodes, wherein the identification information of the plurality of nodes comprises credentials of the respective plurality of nodes, Mobile Equipment (ME) identity information of the respective plurality of nodes, pre-authorized location information of one or more cells associated with the respective plurality of nodes, and cell identities of the one or more cells having the pre-authorized location information;

receive, from a first node, identification information of the first node comprising credentials of the first node, ME identity information of the first node, location information of a cell in which the first node is camping, and a cell identity of the cell, wherein the first node is an Integrated Access Backhaul (IAB)-User Equipment (UE);

compare all of the identification information of the first node from the receiving step with all of the identification information of the plurality of nodes from the storing step; and determine, according to the identification information of the first node being compared with the identification information of the plurality of nodes, that:

the first node is authorized to connect to a network based on the identification information of the first node matching all of the stored mapping information, wherein the mapping information maps the credentials of the plurality of nodes to the identification information of the plurality of nodes; or the first node is unauthorized to connect to the network based on at least a portion of the identification information of the first node not matching the stored mapping information.

* * * * *